Nov. 24, 1970   K. C. MOSIER   3,541,900
NUT FEEDING AND DRIVING APPARATUS
Filed Nov. 14, 1968   10 Sheets-Sheet 1
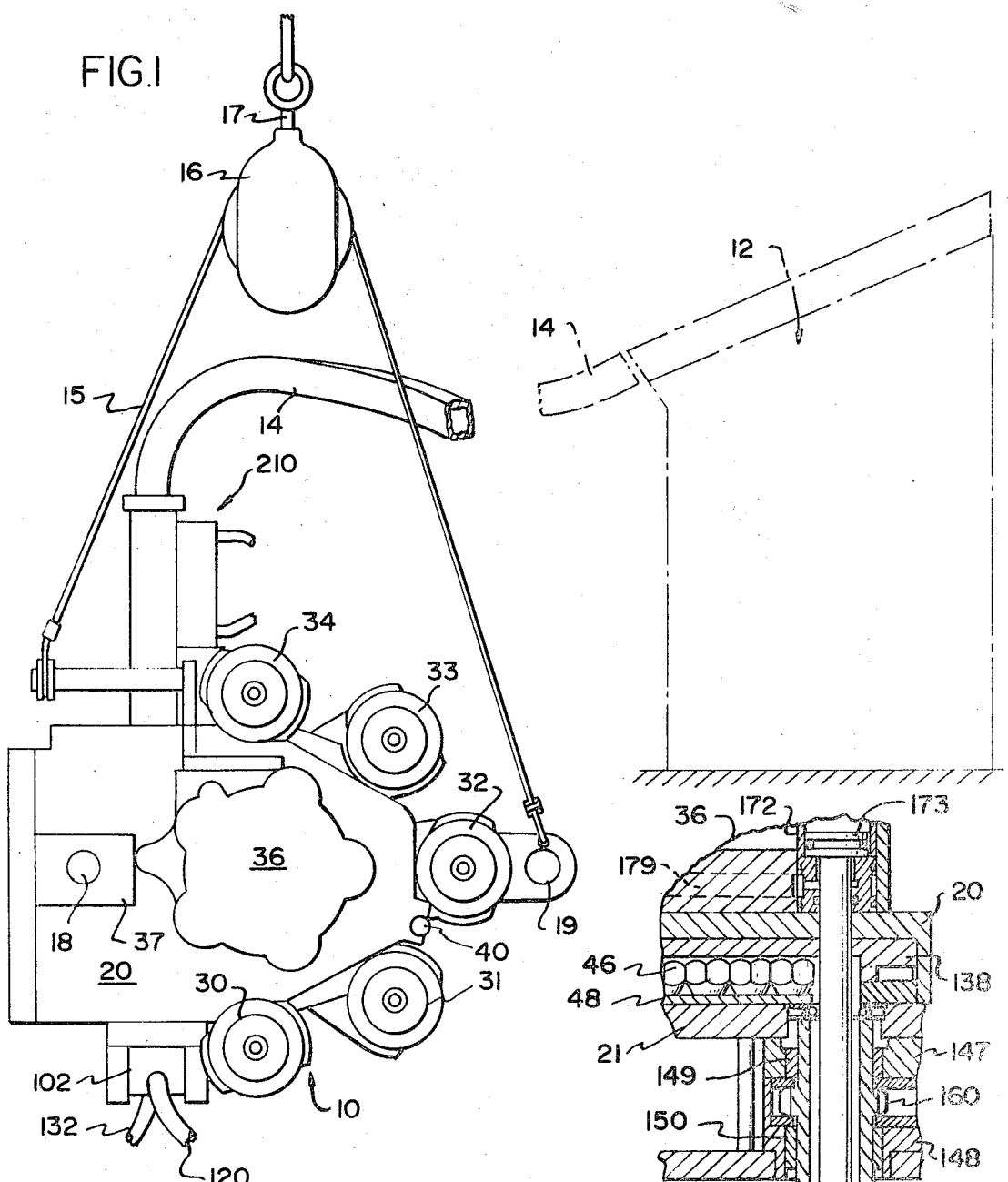
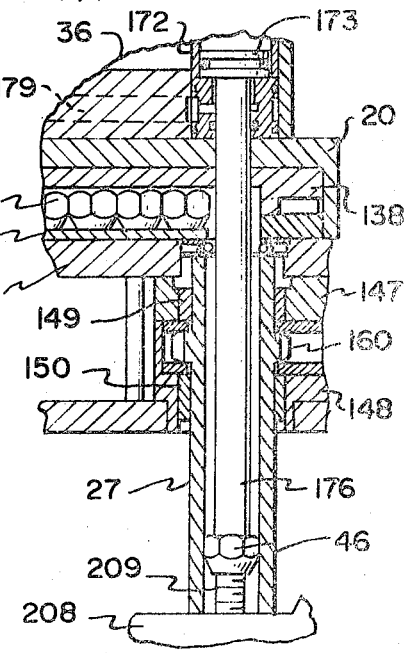
INVENTOR.
KENNETH C. MOSIER
BY Woodruff A. Morey
ATTORNEY.

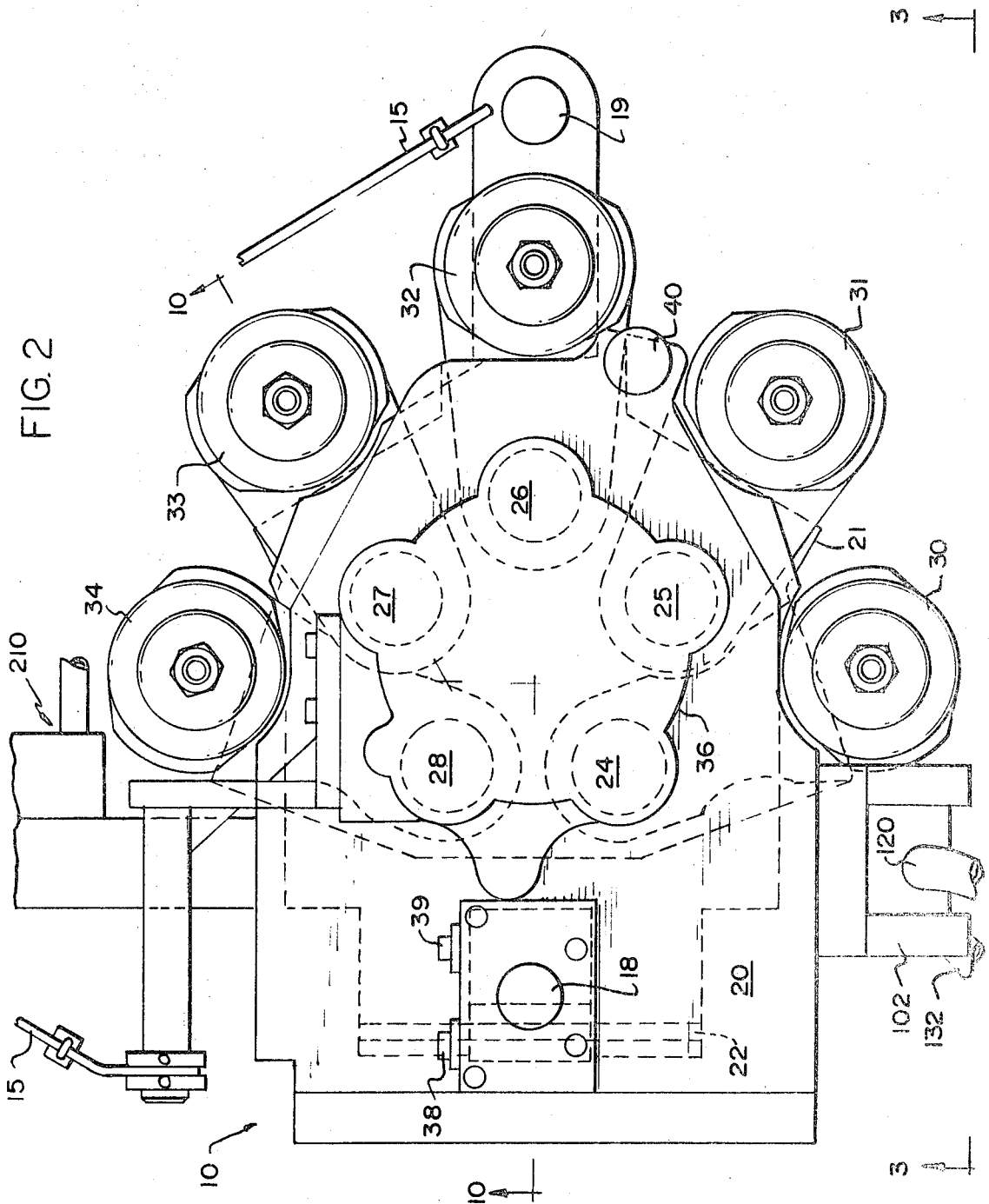

INVENTOR.
KENNETH C. MOSIER
BY Woodruff A. Morey
ATTORNEY.

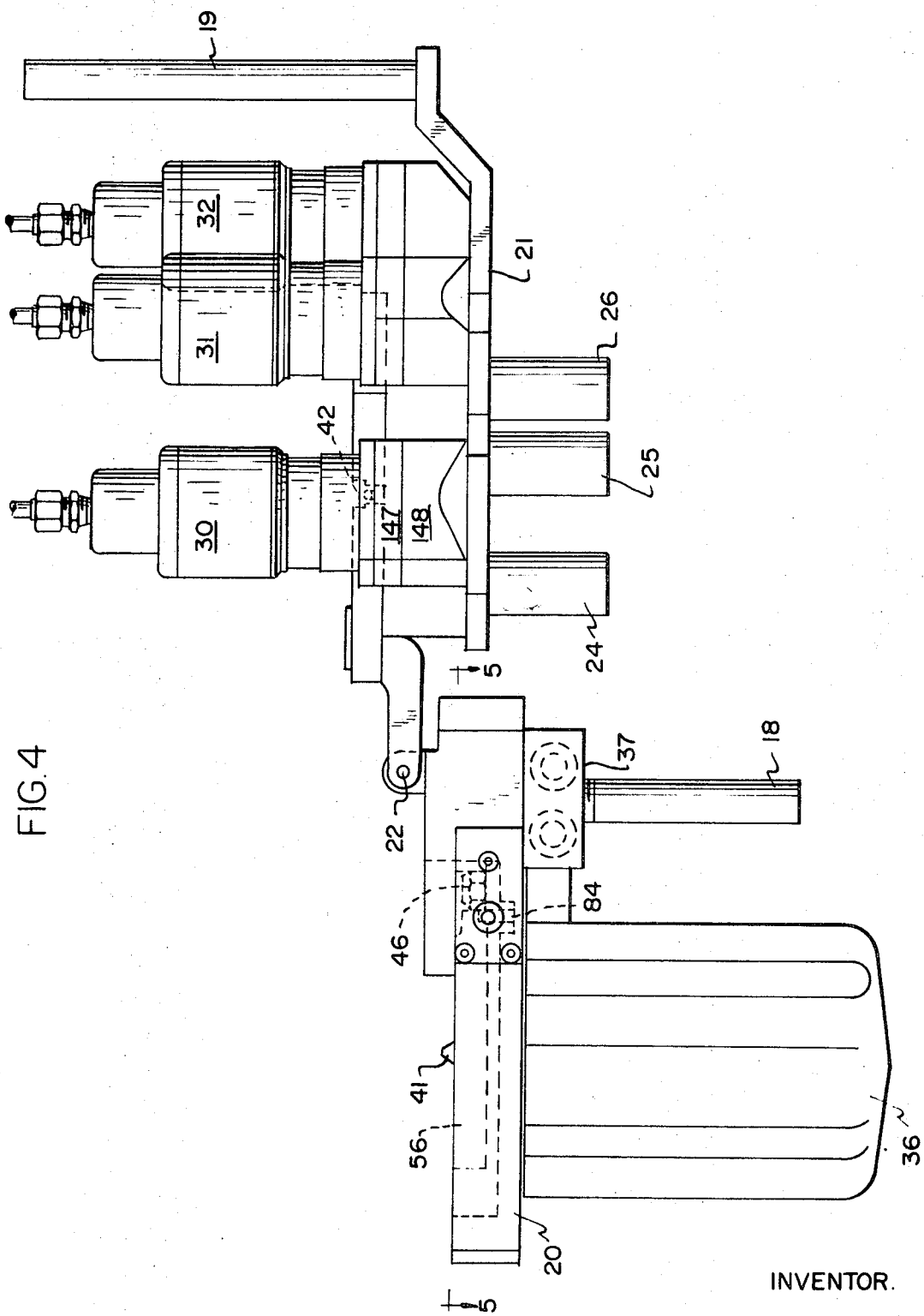

Nov. 24, 1970   K. C. MOSIER   3,541,900
NUT FEEDING AND DRIVING APPARATUS
Filed Nov. 14, 1968   10 Sheets-Sheet 5

INVENTOR.
KENNETH C. MOSIER
BY Woodruff A. Morey
ATTORNEY.

Nov. 24, 1970 K. C. MOSIER 3,541,900
NUT FEEDING AND DRIVING APPARATUS
Filed Nov. 14, 1968 10 Sheets-Sheet 6

INVENTOR.
KENNETH C. MOSIER
BY Woodruff A. Morey
ATTORNEY

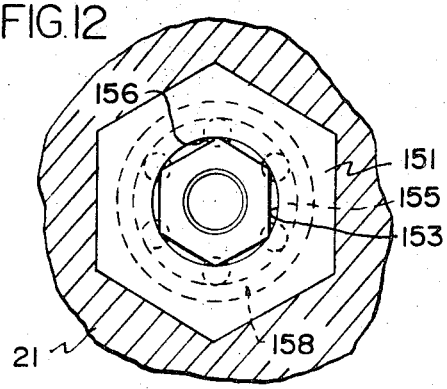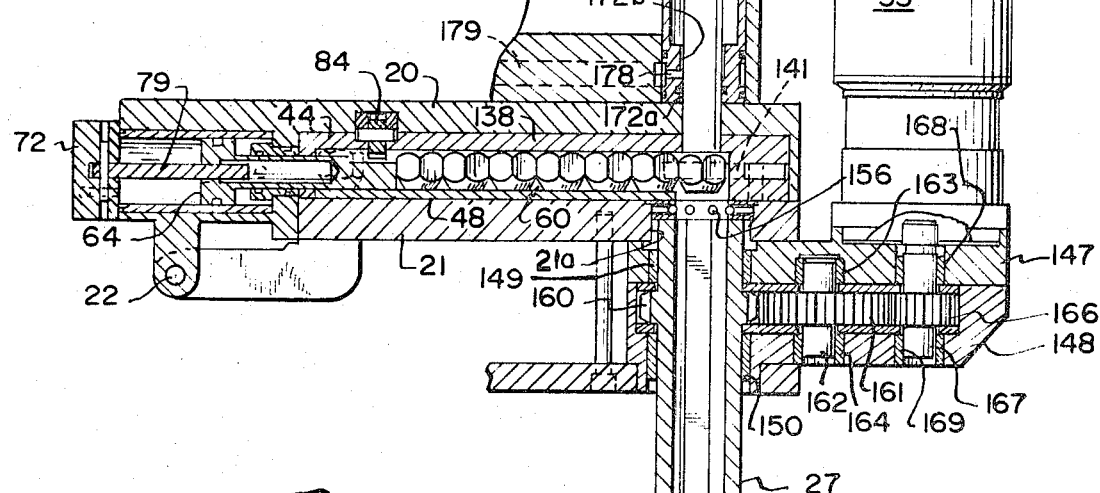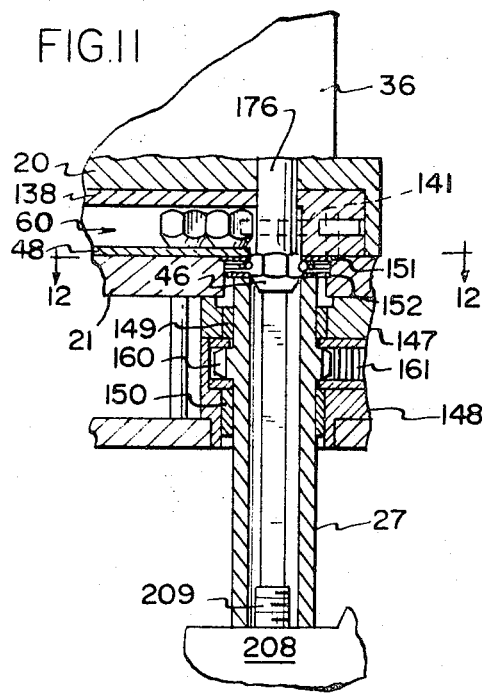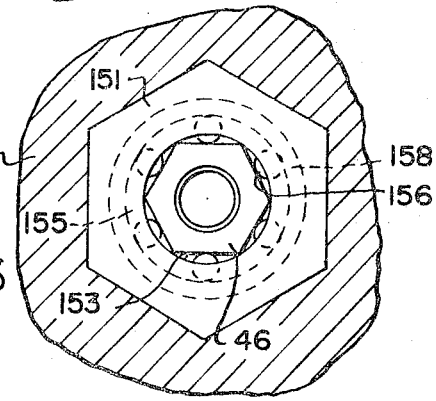

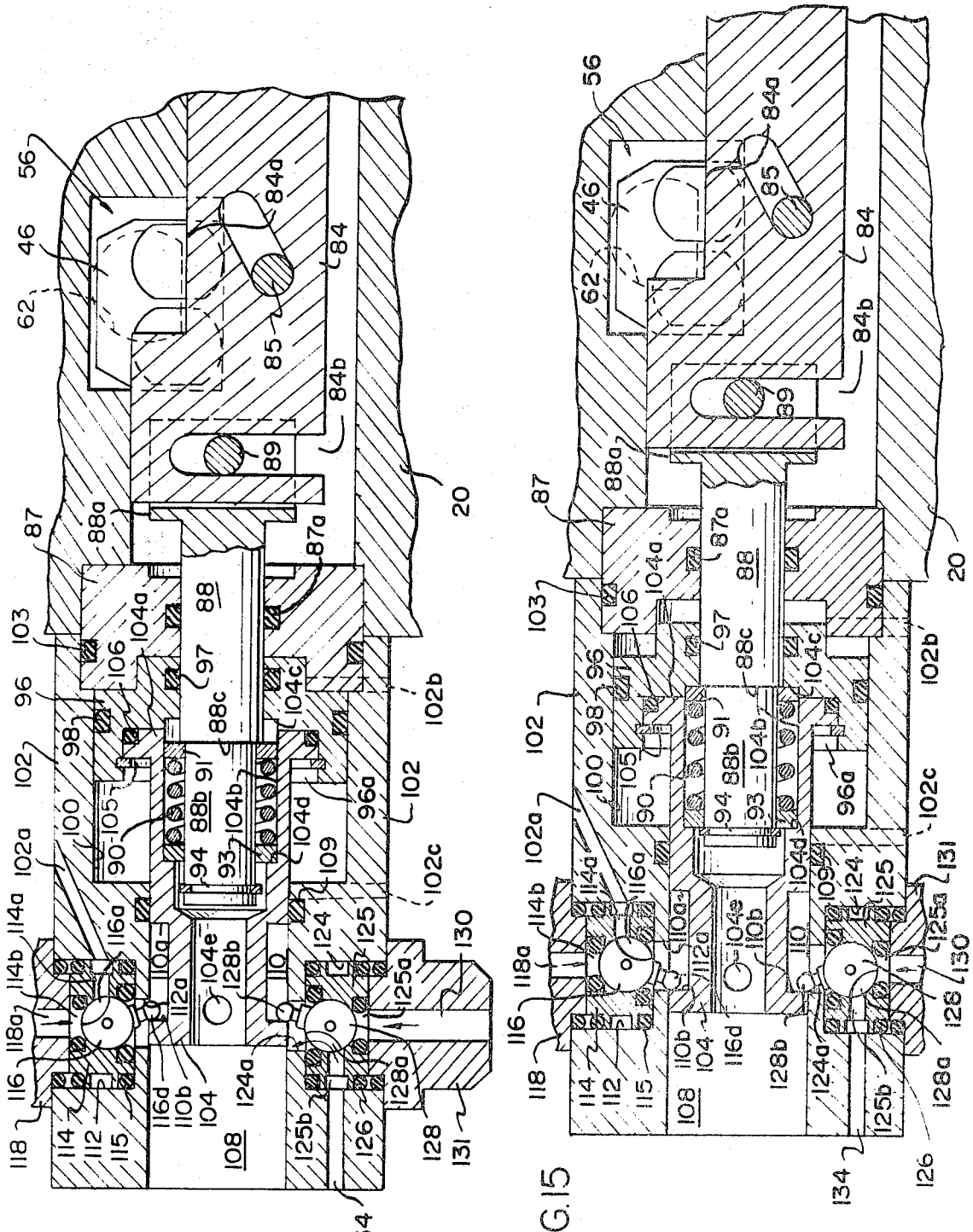

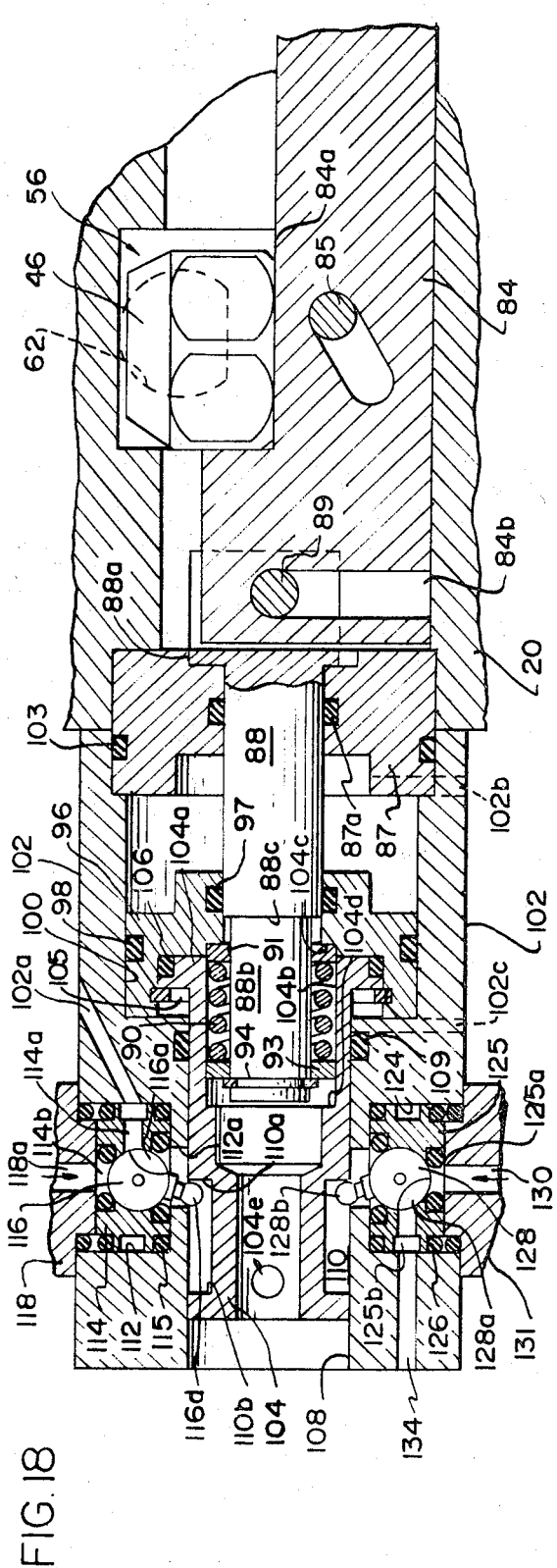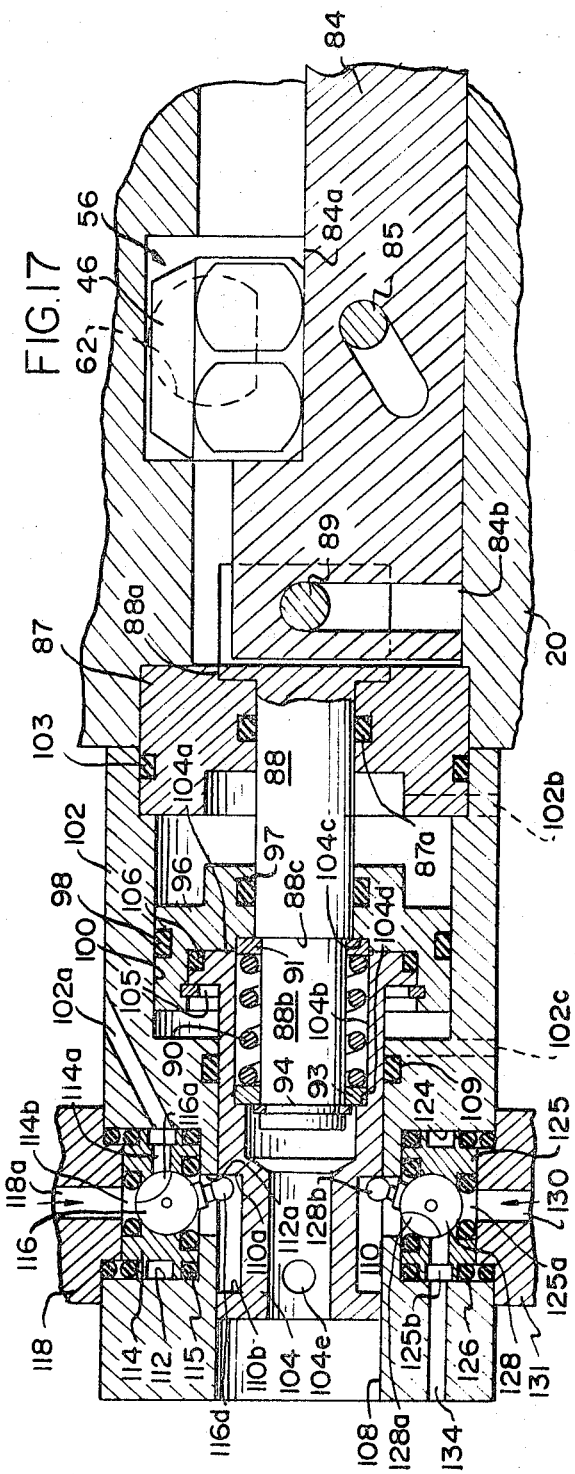

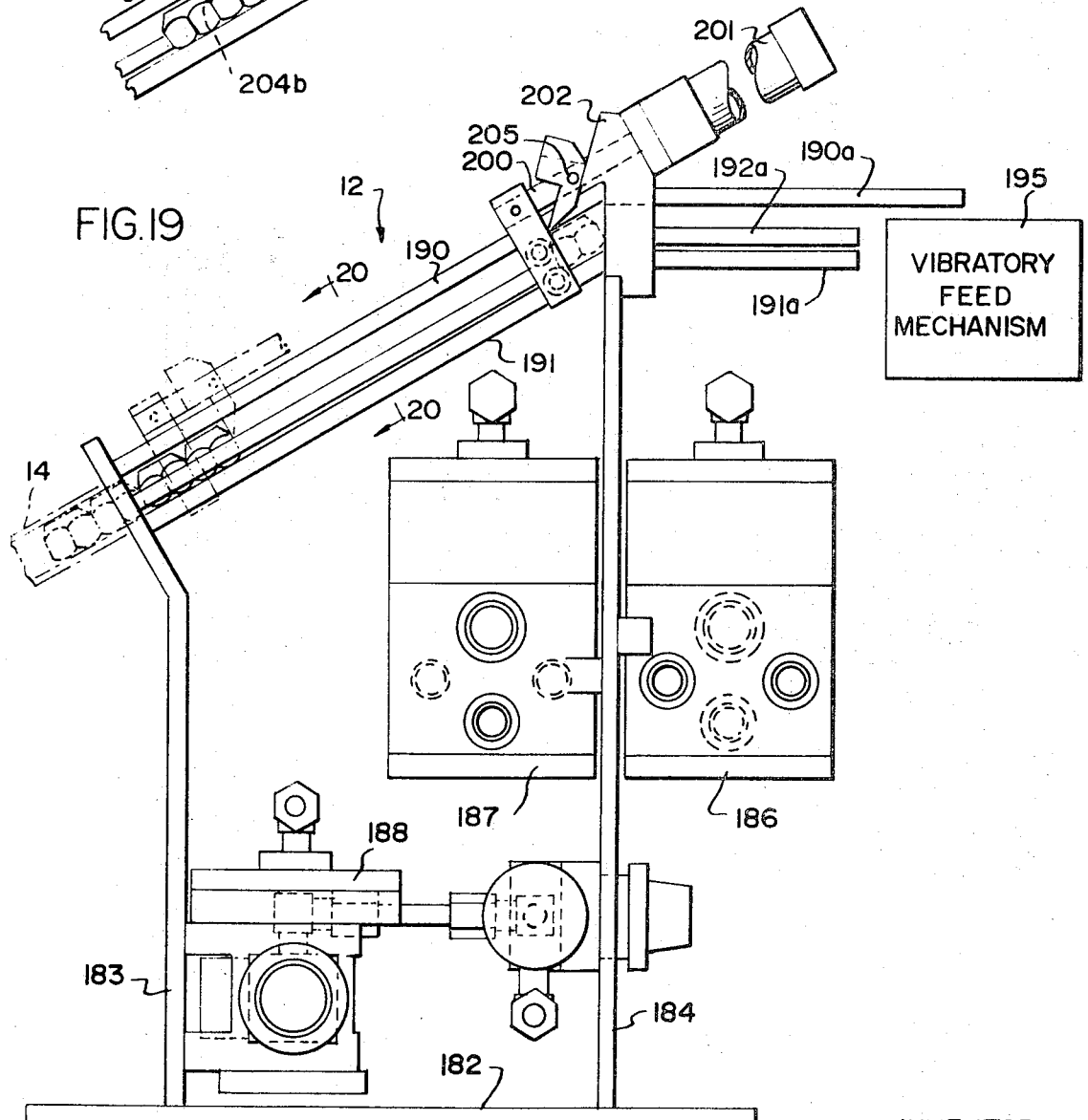

United States Patent Office 3,541,900
Patented Nov. 24, 1970

3,541,900
NUT FEEDING AND DRIVING APPARATUS
Kenneth C. Mosier, 3516 Springdale Ave.,
Dayton, Ohio 45429
Filed Nov. 14, 1968, Ser. No. 775,688
Int. Cl. B25b 17/00, 23/02, 13/00
U.S. Cl. 81—57.23                                28 Claims

ABSTRACT OF THE DISCLOSURE

The apparatus includes a hand manipulatable driving unit, a stationary nut advancing unit, and a single flexible tube or nut conduit connecting these units. The advancing unit includes mechanism for supplying nuts to the flexible conduit, the latter being designed to receive the nuts in a continuous train with the nuts in flat-to-flat relation. The driving unit includes a passageway communicating with the conduit for receiving the nuts in a continuous train. The housing of the driving unit includes means defining a plurality of other passageways communicating with the first mentioned passageway and also communicating with respective powered spindles mounted on the housing. The driving unit mounts a plurality of plungers, one for each spindle, for substantially simultaneously advancing nuts from the single train of nuts to respective spindles. The driving unit also mounts a plurality of pneumatically actuated reciprocal pushers for forcing the nuts axially through the spindles for substantially simultaneous threading engagement of the nuts with respective studs, such as the studs on an automobile wheel.

OBJECTS OF THE INVENTION

A primary object of the present invention is the provision of new and improved apparatus for automatically and continuously feeding nuts to a plurality of powered spindles.

Another object of the invention is the provision of an apparatus of the type described wherein the nuts are positively displaced or advanced from a supply or advancing unit to the powered spindles.

Still another object of the present invention is the provision of an apparatus of the type described which includes a hand manipulatable driving unit, a stationary nut advancing or supply unit, and a single flexible feed tube or conduit connecting such units.

Another object of the present invention is the provision of a nut feeding and driving apparatus including a plurality of powered spindles and means for automatically supplying nuts thereto, whereby in operation the spindles are placed over respective studs and then the nuts are advanced axially through the spindles for threading engagement with respective studs.

Still another object of the present invention is the provision of an apparatus according to the foregoing object, wherein the nuts are independently and yieldably advanced into threading engagement with respective studs.

Another object of the present invention is the provision of a new and improved nut feeding and driving apparatus which includes unique means orienting a nut with a rotating spindle for being driven thereby.

Still another object of the present invention is the provision of a nut feeding and driving apparatus including a housing supporting a plurality of powered spindles, the housing including a first passageway for receiving nuts in a continuous train, and the housing including second passageways communicating with said first passageway and with respective spindles, and plungers for substantially simultaneously feeding nuts from the first passageway to the second passageways.

Another object of the present invention is the provision of an apparatus according to the foregoing object, which apparatus includes a gate for blocking movement of the nuts from the first passageway to the second passageways, operation of the aforesaid plungers being in response to movement of the gate thereby to prevent jamming of nuts in the driving unit.

These and other objects and advantages of the invention will become apparent from the following specification disclosing a preferred embodiment shown in the accompanying drawings.

DESCRIPTION OF THE DRAWINGS

FIG. 1 is a side elevational view of the nut feeding and driving apparatus of the present invention, with the outline of the nut advancing or supply unit being shown in phantom lines;

FIG. 2 is an enlarged elevational view of the hand manipulatable nut driving unit;

FIG. 4 is a view similar to FIG. 3 and showing the housing of the nut driving unit opened to permit access of the nuts in the various nut receiving passageways;

FIG. 10 is a section taken along the line 10—10 of FIG. 2;

FIG. 11 is a partial section similar to FIG. 10 and showing a nut entering one of the powered spindles;

FIG. 12 is an enlarged section taken along the line 12—12 of FIG. 11;

FIG. 13 is a section similar to FIG. 12 and showing a nut in a different relation with respect to the nut orienting balls;

FIG. 14 (adjacent FIG. 3) is a section similar to FIG. 11 and showing a nut as it commences threading engagement with an automobile wheel stud;

FIG. 15 is an enlarged fragmentary section taken along the line 15—15 of FIG. 5;

FIG. 16 is a section similar to FIG. 15 and showing a different stage of operation of the gate actuating means;

FIG. 17 is an enlarged section taken along the line 17—17 of FIG. 8;

FIG. 18 is a section similar to FIG. 17 and showing a different stage of operation of the gate actuating means;

FIG. 19 is an enlarged elevational view of the nut advancing or supply unit;

FIG. 20 is a section taken along the line 20—20 of FIG. 19;

FIG. 21 is a fragmentary side elevational view showing certain of the components of the nut advancing unit in a position different from that shown in FIG. 19;

DESCRIPTION OF A PREFERRED EMBODIMENT

Figure 3:
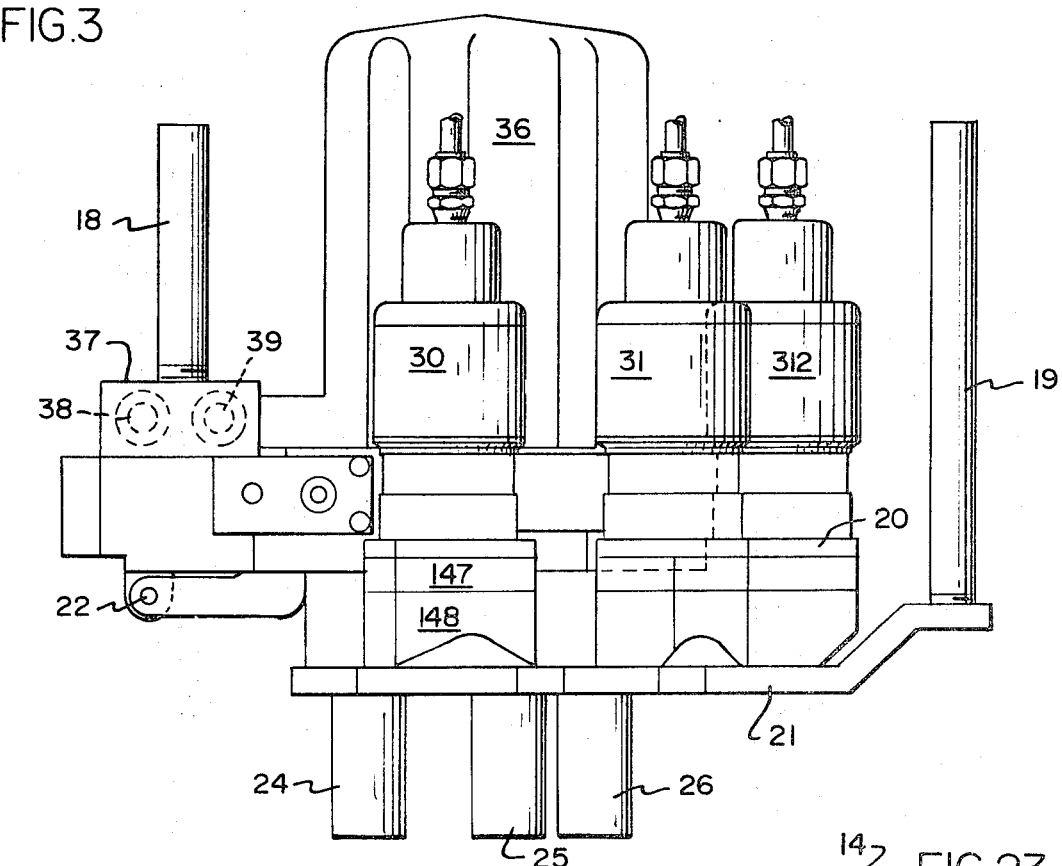
FIG. 3 is a bottom plan view taken along the line 3—3 of FIG. 2.

Referring to FIG. 1, the apparatus of the present invention will be seen to include a hand manipulatable nut driving unit 10, a stationary nut advancing or supply unit 12, and a flexible conduit 14 connecting these units. The tube or conduit 14 may be of any suitable construction for receiving and guiding nuts in a single continuous train in side-to-side relation.

The embodiment of the invention shown for purposes of illustration is specially adapted for use adjacent an automobile assembly line for simultaneously running or driving nuts on the studs of an automobile wheel, the studs being in a standard pattern defining a five-sided polygon. The driving unit 10 is suspended by a cable 15, the latter being engaged with a pully wheel assembly 16; this assembly is supported from a swivel 17, such swivel being suspended from suitable overhead support means (not shown). The driving unit includes a pair of horizontally disposed operator handles 18 and 19 permitting the unit 10 to be manipulated for proper alignment with the studs of an automobile wheel.

Referring primarily to FIGS. 2–4, the nut driving unit 10 includes a housing consisting of parts 20 and 21 hingedly or swingably connected to each other about a hinge pin 22. The part 21 supports five spindles 24–28 arranged with the rotational axes thereof for respective coaxial alignment with the studs of an automobile wheel. The part 21 supports adjacent its peripheral portion five pneumatic motors 30–34 connected with respective spindles 24–28 for driving the latter as will be explained herein. The housing part 20 mounts a generally cylindrical shell 36 closed at the outer end thereof, which shell encloses five pneumatically operated reciprocal pushing members which will be referred to below. As noted in FIG. 4, the operator handle 18 is mounted from a block 37, the latter being in turn mounted by the housing part 20. The block 37 supports operator control buttons 38 and 39.

Suitable clamp means, designated 40 in FIG. 2, are provided for releasably clamping the housing parts 20 and 21 together in the closed position illustrated in FIG. 3. A dowel 41 on the housing part 20 and a dowel opening 42 on the housing part 21 serve to insure proper alignment of the housing parts.

Figure 5:
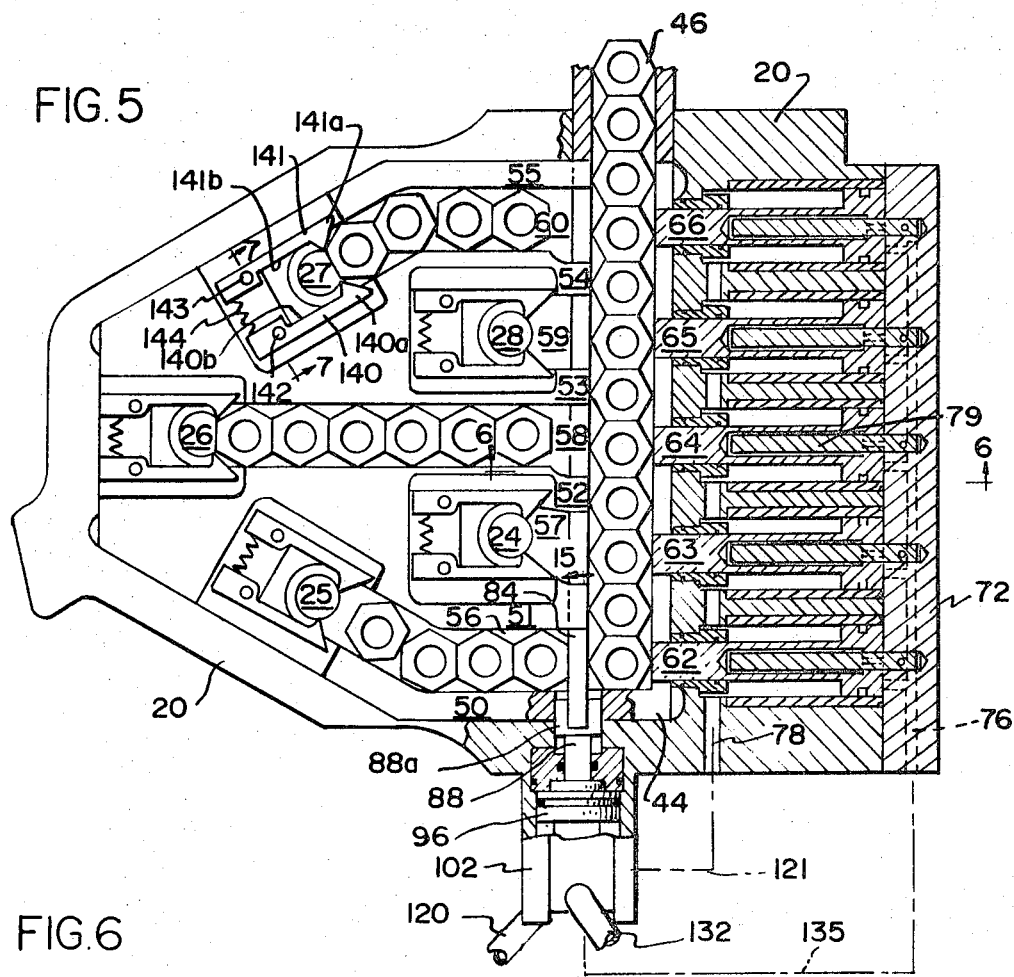
FIG. 5 is an enlarged section taken along the line 5—5 of FIG. 4.
Figure 6:
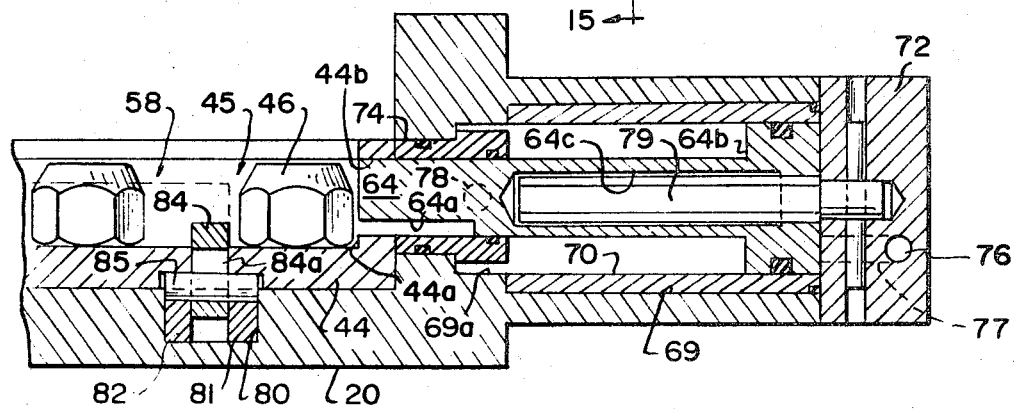
FIG. 6 is an enlarged section taken along the line 6—6 of FIG. 5.

Referring now to FIGS. 5 and 6, the housing part 20 has a guide plate 44 mounted in a cavity therein, such plate defining a rectilinear passageway 45 which serves as an extension of the conduit flexible tube 14. The passageway 45 is adapted to receive a plurality of hexagonal nuts 46 arranged in flat-to-flat relation, the plate 44 including an integral wall portion 44a (FIG. 6) for guiding the nuts. From FIGS. 4 and 6, it will be noted the passageway 45 is exposed when the housing parts are swung apart to the opened position of the housing. When the housing parts 20 and 21 are clamped together the passageway 45 is completed or enclosed by a plate 48 (FIG. 10) forming a portion of the housing part 21. The housing part 20 includes partition wall means 50–55 defining therebetween passageways 56–60 which communicate with a common side of the passageway 45. The passageways 56–60 are in respective communication with the inner ends of the spindles 25, 24, 26, 28 and 27.

The housing part 20 mounts five plungers 62–66 in alignment with respective passageways 56–60. FIG. 6 shows the plunger 64 in detail and also shows the means for actuating the same; it will be understood the construction shown in this figure is typical of the other plungers and the means mounting the same.

The plunger 64 has a cut-out portion 64a at one end thereof and an integral piston 64b at its other end. The housing part 20 includes a bore 69 receiving a sleeve 70, the latter defining a cylinder for the piston 64b, such cylinder being closed by an end plate 72 suitably secured to the housing part 20. The bore 69 has a reduced in diameter portion supporting one end of the plunger 64 for reciprocal movement therethrough. An opening 44b in the plate 44 is provided to allow entry of the plunger into the passageway 45.

The plate 72 has a bore 76 formed therein, the latter communicating with a bore 77 for admitting fluid under pressure to the cap end of the piston 64b. The housing part 20 has a bore 78 communicating with an annular space defined by the sleeve 74 and the bore portion 69a for admitting a fluid under pressure to the other side of the piston 64b. The plunger 64 has a hexagonal shaped blind bore 64c slidably receiving a complementary shaped stud 79 to prevent rotation of the plunger. This stud is supported from the plate 72. It will be understood the plunger 64 is reciprocated by fluid pressure for feeding nuts 46 one at a time into the passageway 58 thereby to advance a continuous train of nuts to the spindle 26.

Figure 9:
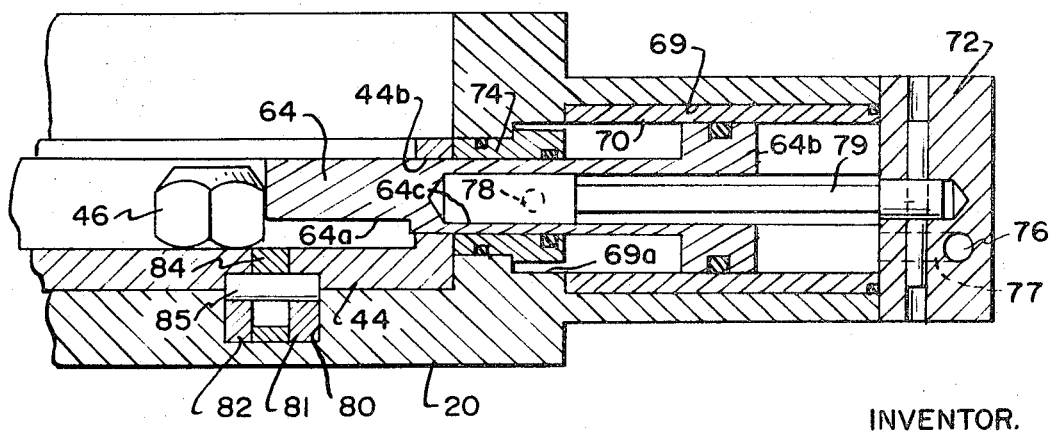
FIG. 9 is an enlarged section taken along the line 9—9 of FIG. 8.

The housing part 20 includes an elongated, rectilinear notch or cut-out 80 mounting a pair of bars 81, 82, the latter mounting a gate plate 84. The bars 81 and 82 support a plurality of pins 85 which are received in inclined slots 84a (FIGS. 15–18) for mounting the gate for movement back and forth between a blocking or closed position shown in FIGS. 6, 15 and 16 and a recessed or opened position shown in FIGS. 9, 17 and 18. It will be understood that when the gate 84 is in its blocking position, movement of nuts from the passageway 45 through the passageways 56–60 is prevented as well as movement of nuts from the latter to the former. When the gate 84 is moved away from its blocking position, i.e., to the recessed position, movement of nuts is permitted from the passageway 45 and into the other passageways communicating therewith.

Fluid pressure operated means, best shown in FIGS. 15–18, are provided for moving the gate back and forth between its blocking position and its recessed position. These means include an annular member 87 slidably receiving a rod 88 having a bifurcated end 88a mounting a cross-pin 98 which is received in a slot 84b in the gate. An O-ring 87a forms a seal with the rod 88. The rod 88 has a reduced in diameter portion 88b which receives a compression spring 90. One end of the spring abuts a washer 91 abutting an annular shoulder 88c; the other end of this spring abuts a washer 93 which in turn abuts a snap ring 94 received in a suitable annular groove in the rod portion 88b. A piston 96 is mounted on the rod 88 for axial movement relative thereto, this piston including annular grooves receiving O-rings 97 and 98 forming seals between the rod 88 and a bore 100 formed in a housing block 102, the latter being secured to the housing part 20. An O-ring 103 forms a seal between member 87 and block 102. Bores 102b and 102c communicate with a fluid pressure source (not shown) for reciprocating the piston 96.

A piston extension 104 has one end thereof defined by a flange 104a, this end being snugly received in a recess 96a in the piston 96 and retained therein by means of a snap-ring 105 received in an annular groove formed in the recess 96a. The joint between the piston 96 and the piston extension 104 is sealed by an O-ring 106. The piston extension 104 has an internal bore with an enlarged portion 104b defined by annular shoulders 104c and 104d arranged for abutting engagement with respective washers 91 and 93.

The piston extension 104 is slidably received in a bore 108 formed in the block 102, this bore being in coaxial communication with the bore 100. The block 102 includes an annular recess opening into the bore 108, which recess receives an O-ring 109 for sealing engagement between such bore and the piston extension 104. The piston extension 104 includes an annular recess 110 defining annular shoulders 110a and 110b. This recess is in communication with the internal bore of the piston extension 104 by one or more ports 104e.

The block 102 includes a cavity 112 which is in communication with the bore 108 by means of an opening 112a. A valve block 114 is received in the cavity 112 in sealing relation therewith as by means of a number of O-rings 115. The valve block 114 contains a cross-bore rotatably receiving a valve member 116, which valve member has an arcuate notch 116a. The valve block 114 is provided with a bore 114a in communication with an inclined bore 102a in the block 102. The valve block 114 has an opening 114b in communication with a bore 118a formed in a fitting 118, the latter being connected to one end of a flexible tube 120 (FIG. 5) which extends to a suitable source of fluid pressure (not shown). The inclined bore 102a is in communication with a tubular conduit 121 (FIGS. 5 and 8), the latter communicating with the bore 78. When the valve member 116 is in the position shown in FIG. 15, the recess 116a serves to communicate the bore 102a with the opening 112a which opens to atmosphere through the ports 104e. When the valve member 116 is rotated in the position illustrated in FIG. 16, the source of fluid pressure is admitted to the bore 102a via the recess 116a and the openings 114a, 114b; this results in the admission of fluid pressure to the rod sides of the pistons 64b.

The block 102 includes another cavity 124 communicating with an opening 124a which opens into the bore 108. A valve block 125 is received in the cavity 124 in sealing engagement with the walls thereof as by means of a plurality of sealing rings 126. The valve block 125 includes a cross-bore rotatably receiving a valve member 128, the latter having an arcuate notch 128a. The block 125 contains a bore 125a communicating with a bore 130 formed in a fitting 131; this fitting is in engagement with one end of a flexible tube 132 (FIGS. 1 and 2) which extends to a suitable source of fluid pressure (not shown). The valve block 125 includes another bore 125b in communication with a bore 134 formed in the block 102; the bore 134 is in communication with a tube 135 (FIGS. 5 and 8) which is in communication with the bore 76 in the plate 72 secured to the frame part 20.

When the valve member 128 is in the position shown in FIG. 15, the bore 130 is placed in communication with the bore 134 for admitting fluid under pressure to the cap sides of the plunger pistons 64b. Rotation of the valve member 128 to the position illustrated in FIG. 16 places the bore 134 in communication with the bore 108 for venting the cap sides of the plunger pistons to atmosphere.

The valve members 116 and 128 include respective valve actuating extensions 116b and 128b. These extensions are received within the annular recess 110 in the valve extension 104 for being alternately engaged by the flanges 110a, 110b for actuating the valve members 116 and 128 in a manner to be described hereinbelow.

As mentioned above, passageways 56–60 extend to and communicate with respective spindles. Referring to FIG. 10, the passageway 60 is defined by the plate 48, a plate 138 secured to the housing part 20, and by a pair of opposed walls or plates (not shown). When the housing parts 20 and 21 are swung to the open position shown in FIG. 4, the passageway 60 is exposed for access to the nuts therein; the other passageways are also exposed during opening of the housing.

Figure 7:
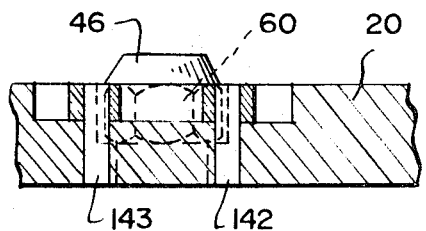
FIG. 7 is an enlarged section taken along the line 7—7 of FIG. 5.

Nut retaining means are provided for receiving the nuts just prior to entry into the spindles. Referring to FIGS. 5 and 7, such retaining means will be seen to include a pair of arms 140, 141 pivotally mounted by respective pins 142 and 143. A compression spring 144 engages corresponding ends of these arms for urging the other end of the arms together. These other ends have pointed formations 140a, 141a arranged to be engaged by one of the nuts 46 for spreading such ends apart. The side faces 140b, 141b of these arms engage the flats of a nut and orient the same such that one of the point-to-point axes of the nut is either parallel with or perpendicular to the direction of movement of such nut. These arms hold a nut and prevent dropping of the same into the spindle. It will be understood that the nut retaining means just described, which is associated with the passageway 60 and the inlet end of the spindle 65, is identical with the nut retaining means provided for the other spindle passageways.

Referring now to FIG. 10, the housing part 21 mounts plates 147 and 148, which plates include aligned bores receiving respective roller bearing assemblies 149 and 150 rotatably mounting the spindle 27, the inner end of the latter extending into an opening 21a formed in the part 21. The bore 21a contains an enlarged hexagonal shaped portion receiving hexagonal plates 151, 152 (FIG. 11), which plates have respective aligned openings 153 (FIGS. 12 and 13) with their centers lying on the axis of rotation of the spindle 27. Mounted between the plates 151 and 152 are a plurality of spacers 155 defining pockets for receiving six balls 156. The pockets may be considered as being defined by bores having equally spaced radii contained in a plane perpendicular to the axis of rotation of the spindle 27. These bores or pockets trap and maintain the balls 156 in cooperation with an O-ring 158, the balls being allowed to project inwardly such that their innermost portions define a circle having a diameter just slightly less than the distance across one of the fasteners 46 measured from opposing flat sides.

The spindle 27 is formed with an integral ring gear formation 160 in meshing engagement with an intermediate gear 161, the latter being rotatably mounted on a pin 162 having its opposite ends received in needle roller bearing assemblies 163 and 164 received in suitable bores formed in respective plates 147 and 148. The intermediate gear 161 is in meshing engagement with a gear 166 which is mounted on a spindle 167. This spindle is rotatably mounted in needle roller bearing assemblies 168, 169 received in aligned bores in the plates 147 and 148. Spindle 167 is driven from a pneumatic motor 33. It should be apparent that operation of this pneumatic motor will impart rotation to the spindle 27.

A pneumatically operated pushing member is associated with each spindle for forcing nuts one at a time thereinto. Referring to FIG. 10, the shell 36 mounted on the housing part 20 supports a cylinder 172 which receives a piston 173. One end of the cylinder 172 is closed by shell portion 36a and placed in communication with a bore 175 which is in communication with a source of fluid under pressure. A piston rod 176 is secured to the piston 173, this rod extending through a bore 172a defined in the other end of the sleeve 172. The housing part 20 and the plate 138 are provided with aligned bores for receiving the piston rod 176. The sleeve 172 includes an enlarged bore 172b defining an annular space with the piston rod 176, such annular space being in communication with a bore 178, the latter communicating with a bore 179 formed in a portion of the shell 36. At this time it should be mentioned that the bore 179 is always in communication with the source of fluid under pressure during operation of the apparatus. Fluid under pressure is selectively admitted to the passageway 175 as will be explained hereinbelow.

It should be apparent the piston rod 176 serves to push a nut 46 from the slide retaining means consisting of the arms 140 and 141 and through the nut orienting means consisting of the balls 156 for entry of the nut into the spindle 27. The spindle 27 is of course provided with a hexagonal in cross-section bore for driving engagement with the flat sides of the nut. The retaining means including the formations 140a, 141a facilitate entry of the nuts into the opening defined by the balls 156.

In some instances, at the precise moment of engagement between the nut and the spindle bore, the sides of the nut will be in alignment with the sides of the spindle bore such that the nut will readily pass into such bore. If the sides of the nut are not in alignment with the sides of the spindle bore, the nut will of course commence to rotate with the spindle. The orienting balls 156 engage the sides of the nut to restrain rotation thereof for causing relative rotation between the nut and the spindle until such time as the sides of the nut come into alignment with the sides of the spindle bore whereupon the nut will pass into the bore in the spindle. Should the nut encounter the orienting balls 156 in the relationship shown in FIG. 12, the balls will serve to cam or rotate the nut in either direction until the flat sides thereof are engaged by the balls in the relationship shown in FIG. 13.

At this time it should be mentioned that the means for mounting and driving the spindle 27 shown and described in connection with FIG. 10 are identical to the means mounting and driving the other spindles on the nut driving unit 10. Also, it will be understood the other spindles are provided with reciprocal pushing means identical to that shown in FIG. 10 for forcing nuts into the spindles.

Turning now to FIGS. 19–21, the nut advancing or supply unit 12 includes a stationary base consisting of frame plates 182–184 which support the various regulators and associated equipment 186–188 forming part of the fluid pressure system of the apparatus of the present invention. The frame plates 183 and 184 mount four bars 190–193 defining an inclined guideway having an outlet which is suitably mounted with the flexible tube or conduit 14. The other end of this inclined guideway is in communication with a horizontal guideway defined by bars 190a–193a adjoining respective bars 190–193. The horizontal guideway defined by these bars extends into the bowl of a vibratory feed mechanism 195 which is of conventional construction. It will be understood this mechanism includes a supply of nuts and advances the same in a single continuous train into the guideways just described. Such a conventional vibratory unit includes means for orienting nuts with their cone portions up and with the nuts aligned flat to flat.

Means are provided for positively advancing a predetermined number of nuts (five in the embodiment shown for purposes of illustration) into the conduit 14. To this end, a U-shaped yoke member 197 is reciprocally mounted on the bars 192, 193 by respective pairs of rollers 198 (FIG. 20) and 199. The yoke is connected to one end of a piston rod 200, the latter extending into a fluid operated cylinder 201 which is mounted from a bracket 202 supported from the frame member 184. A pushing member 204 is bifurcated and pivotally mounted on the piston rod 200 by means of pivot pin 205. The pushing member 204 is mounted for reciprocal movement between the solid and phantom line position shown in FIG. 19 upon actuation of the cylinder 201. The relationship of the center of gravity of the pushing member 204 to the pivot pin 205 is such that the member 204 tends to assume the position shown in solid lines in FIG. 21 wherein a wall surface 204a rests on the piston rod 200. The bifurcated portion of the member 204 defines fingers 204b which engage a trailing edge of a nut for advancing the same, and the nuts forwardly of such nut, through the inclined guideway and conduit 14·

When the fluid cylinder 201 is actuated, it will be understood the member 204 is advanced for positively displacing five additional nuts into the conduit 14. Upon retraction of the piston 200, the member 204 merely deflects over successive nuts which are fed into the inclined passageway from the vibratory feed mechanism 195.

The stroke of cylinder 201 is greater than required to advance five nuts; it is actually sufficient to displace seven or eight nuts so that pushing member 204 pushes forward and stops when the column of nuts is solid. This makes certain that there are no voids in the nut tube 14 which may have some "valleys."

Figure 8:
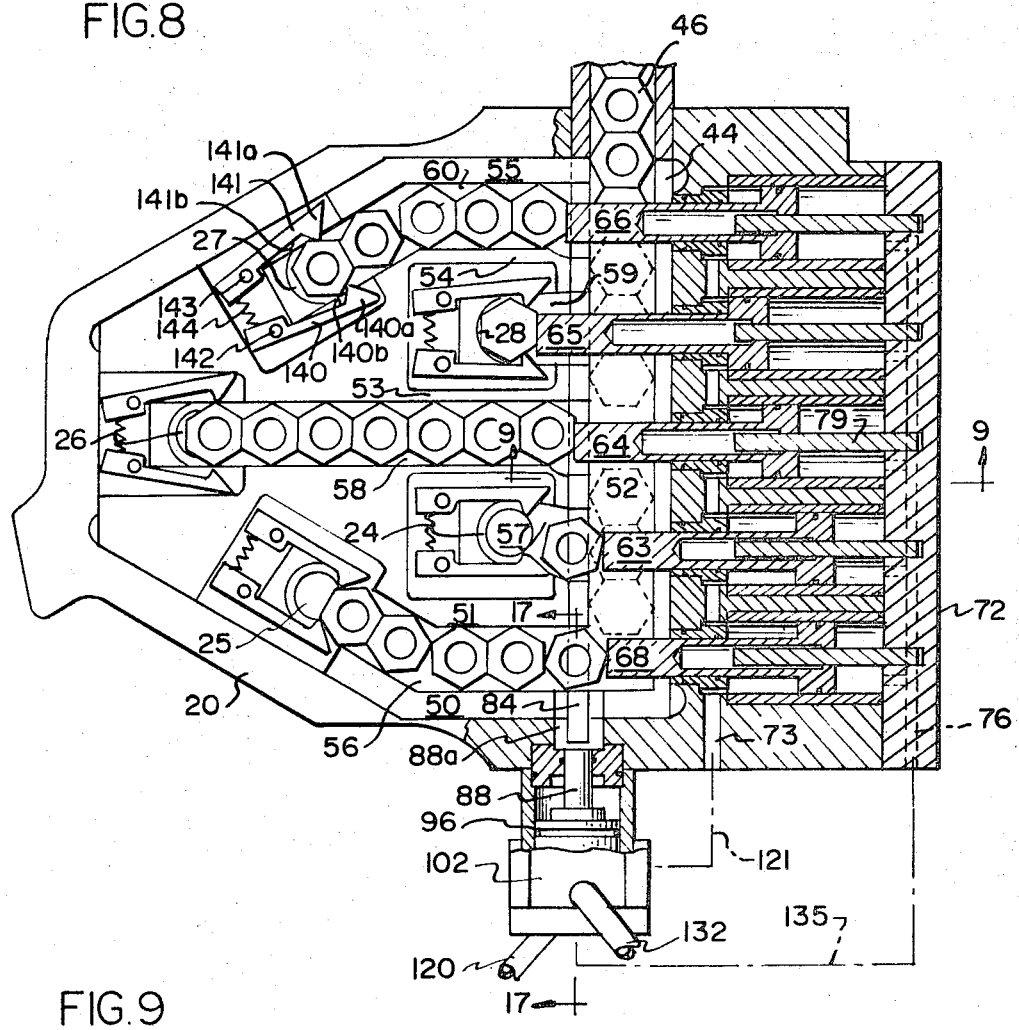
FIG. 8 is a section similar to FIG. 5 and showing the feed plungers extended for feeding nuts to the spindles.

The operation of the nut feeding and driving apparatus of the present invention is as follows:

Assume that five nuts have just been run and that the spindles are empty in which case the gate 84 will be in its blocking position and the plungers 62–66 withdrawn. The various parts of the fluid pressure actuating means and valve means will be in the relationships illustrated in FIG. 16. The operator commences a cycle of operation by depressing the operating button 38 which results in the admission of fluid to bore 102b for driving the piston 96 to the left as viewed in FIGS. 15–18. The piston 96 moves from right to left to the position shown in FIG. 17 thereby to move the gate 84 to its recessed or opened position, this movement of the gate being brought about by movement of the rod 88, the latter moving with the piston 96 through the connection defined by the coil spring 90. The continued application of fluid under pressure to the right side of the piston 96 causes the same to move to the left relative to the rod 88, such movement being permitted by compression of the spring 90. This movement of the piston 96 relative to the rod 88 brings the annular flange 110a on the piston extension 104 into engagement with the valve actuators 116d and 128b for moving these valves to the positions shown in FIG. 18 whereupon fluid under pressure is admitted to the cap sides of the plunger pistons 64b. The rod sides of these pistons are vented to atmosphere through the ports 104e. This results in the plungers 62–66 being extended as shown in FIG. 8 for forcing nuts into the slide retainers defined by the arms 140, 141.

Suitable valving means associated with the time delay means (not shown) cuts off the flow of fluid under pressure to the bore 102b after a predetermined length of time venting that bore to atmosphere simultaneously with admitting fluid under pressure to the bore 102c. This results in the piston 96 being moved from left to right to the position shown in FIG. 15 for moving the gate 84 to its blocking position, this being possible notwithstanding the plungers being in their extended positions, as such plungers are provided with cut-out portions 64a to receive the gate. After the gate 84 has reached its blocking position, the continued application of fluid under pressure to the left side of the piston 96 will result in movement of the latter relative to the rod 88, again this relative movement being permitted by compression of the spring 90. This will result in the piston extension 104a moving to the right such that the flange 110b is brought into engagement with the valve actuators 116b, 128b for rotating the valve members 116 and 128 to the positions illustrated in FIG. 16 whereupon fluid under pressure will be admitted to the rod sides of the plunger pistons 64b and the cap sides of the piston opened to atmosphere through the bore 108. This causes retraction of the various plungers 62–66.

Through suitable valving acting in timed relation with the actuating means for the piston 96, the cylinder 201 is actuated for feeding or advancing five additional nuts through the conduit 14 and into the passageway 45 in the nut driving unit 10. It will be understood that the cylinder 201 acts to contain a continuous train of nuts in the conduit 14 such that upon retraction of the plungers 62–66 the passageway 45 is immediately filled with nuts.

It should be apparent that operation of the gate 84 controls admission of the fluid under pressure to the plunger pistons 64 thereby to prevent jamming of nuts in the nut driving unit 10. That is to say, if for some reason the gate 84 cannot be moved to its blocking position, the plungers 62–66 cannot be retracted and therefore additional nuts cannot be fed through the unit. If the gate 84 cannot be moved to its recessed or opened position, the various plungers cannot be extended. Therefore, if for any reason all five nuts are not advanced through respective spindles, the nut driving unit will become inoperative alerting the operator.

The location of the plungers 62–66 with respect to the location of passages 56–60 is important. The bottom edge of each passage 56–60 (considering the unit to be in an upright position as viewed in FIGS. 5 and 8) adjacent the gate 84 is positioned approximately .010 inch below the bottom flat of the adjacent nut on the opposite side of the gate 84. The width of each opening 56–60 is approximately ⅞ the across-the-flats dimension of each nut, or ⅞ inch in the case of nuts having an across-theflats dimension of ¾ inch. This relationship provides that at least two nuts in the passageway 45 may be oriented in point-to-point relation as opposed to flat-to-flat relation and still allow the uppermost plunger 66 to advance a nut into the passageway 60. The wall formations 50–55 are properly located for preventing jamming by any two nuts attempting to enter the same passageway.

Each plunger 62–66 has its upper surface located approximately .010 inch below the bottom surface of the nut just above the nut to be pushed by such plunger. This prevents each plunger from pushing an intermediate nut into the associated passageway and also provides for retaining an intermediate nut in the passageway 45 so that it will be engaged by the wall formations 50–55 thereby to prevent jamming. The spacing between plungers 62–66 is such that intermediate nuts can rotate with clearance to spare while the plungers are in their extended positions.

It will be observed that each of the plungers 62–66 is adapted to operate independently of the other plungers. This will allow movement of alternate nuts out of the column 45 regardless of whether they are initially engaged by the plungers at their flats or their corners. This independent operation of the plungers allows each plunger to extend to the extent necessary to advance a nut through the associated passageway.

Assume that nuts have been supplied to the nut retaining means associated with each of the spindles. The operator now manipulates the nut driving unit 10 by means of the handles 18 and 19 to locate the various spindles over the respective studs of an automobile wheel 208 (FIG. 10), such wheel mounting five studs, one stud being illustrated and designated 209. The operator then depresses the button 39 located adjacent the handle 18. This causes fluid under pressure to be admitted to the various pneumatic motors 30–34 for rotating respective spindles 24–28. This actuation of the button 39 also admits, by means of suitable valving (not shown), fluid under pressure to the passageway 175 for forcing the pushing members 176 downwardly thereby to force nuts into the rotating spindles, the nuts passing into such spindles in driven relation therewith in a smooth manner and without jamming by reason of the nut orienting means and nut retaining means described above. The reciprocating pushing members 176 advance the nuts into threading engagement with wheel studs 209. As the nuts are advanced on to the spindles in a yieldable manner by reason of the fluid pressure admitted to the cap sides of the pistons 173, the nuts may be thought of as floating within respective spindles. The operator of course exerts sufficient pressure on the unit 10 to hold the nuts in contact with the studs to insure threading of the nuts with the studs. This feature permits the operator to locate the spindles completely over the studs prior to threading engagement of the nuts with the spindles. The advancing or axial movement of the nuts is provided solely by the reciprocal pushing member 176. Since these members are movable independently, it will be apparent threading engagement of all nuts will be effected substantially simultaneously notwithstanding variations in the lengths of the wheel studs. For obvious safety reasons the unit is not actuated until the wheel studs are covered by the spindles.

Appropriate valving means (not shown) may be provided to shut off the flow of pressure to the pneumatic motors after the nuts have been tightened on the studs to a predetermined limit, or the fluid pressure may be such that the motors will stall after the nuts have been tightened as desired. Release of the button 39 will of course stop the motors. Shut off means are also provided for the passageway 175 allowing the pushing members 176 to be retracted by the fluid pressure which is at all times admitted to the passageway 179. The nut driving unit 10 is pulled away from the wheel and the button 38 depressed to commence another cycle of operation. Through conventional valving (not shown), the operation commenced by actuating the button 38 cannot be repeated until after the button 39 is depressed, thereby to prevent jamming.

In some installations, the stationary nut advancing unit 12 and a substantial portion of the flexible tube 14 will be disposed above the hand manipulatable driving unit 10. In such case, the combined action of the force of gravity on the train of nuts in the tube and the positive displacement mechanism associated with the nut advancing unit will subject the nuts in the passageway 45 to a considerable downward force. Such force may make it difficult for the plungers 62–66 to advance alternate nuts in the column 45 in a trouble-free and jam-proof manner. Therefore, it is desirable to provide means to reduce this force to which the nuts in the passageway 45 are subjected. This end, a nut feed control mechanism, generally designated 210, is interposed between the unit 10 and the feed tube 14.

Figure 22:
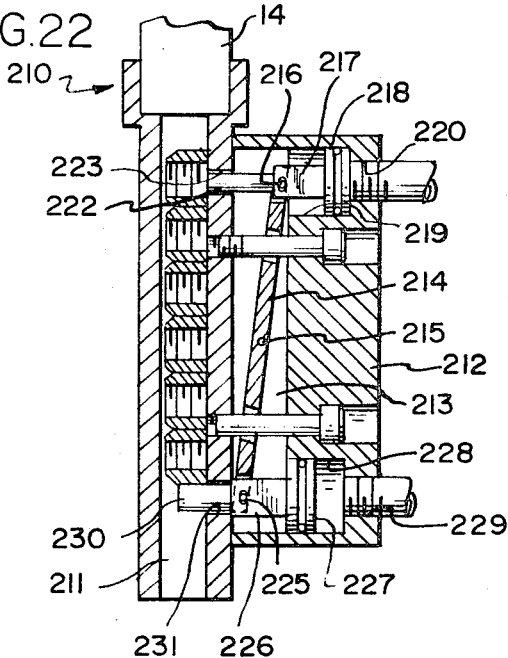
FIG. 22 is a central section taken through a nut feed control mechanism.
Figure 23:
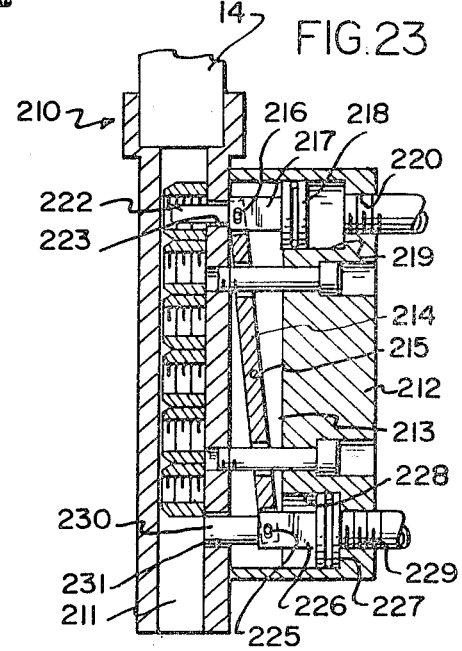
FIG. 23 is a section similar to FIG. 22 and showing the feed control mechanism in a different stage of operation.

Referring to FIGS. 22 and 23, unit 210 includes suitable plates defining a passageway 211, one end of which communicates with the passageway 45 and the other end of which communicates with the interior of the flexible tube 14. The passageway 211 is preferably dimensioned to receive the nuts in flat-to-flat relation. The unit 210 includes a housing 212 having a cavity 213. A lever 214 is pivotally mounted in this cavity by a pin 215. One end of the lever 214 is pivotally connected by means of a pin 216 to a cylindrical formation 217 integral with a piston 218. This piston is reciprocally received in a bore 219 communicating with the cavity 213 and also communicating with a threaded bore 220, the latter receiving one end of a suitable fluid pressure conduit. The piston 218 includes a coaxial, reduced-in-diameter formation 222, which formation is circular in cross-section and aligned for being reciprocated through an opening 223, this opening communicating with the passageway 211.

A pin 225 pivotally connects the other end of the lever 214 with a cylindrical formation 226 integral with a piston 227, the latter being reciprocally received in a bore 228. One end of this bore communicates with the cavity 213; the other end communicates with a threaded bore 229 for receiving one end of another fluid pressure conduit. Piston 227 includes a coaxial, square in cross-section formation 230 which is positioned for being reciprocated through an opening 231, the latter communicating with the passageway 211.

By means of a suitable four-way valve (not shown), pressure is admitted through opening 220 (opening 229 being in communication with exhaust) simultaneously with the admission of fluid pressure to passageway 78 for retracting the plungers 62–66. This will result in pivoting of the lever 214 to the position shown in FIG. 23 resulting in withdrawal of the formation 230 from beneath the lowermost nut and entry of the formation 222 into the threaded opening of the nut which is adjacent such formation 222. This will allow five more nuts to advance to the passageway 45. It will be understood that the formation 222 enters the bore of the associated nut prior to complete separation of the formation 230 from the underside of the lowermost nut. The formation 222 is much smaller in cross-section than the bore of the nut thereby to provide a tolerance for insuring entry of the formation 222 into the associated nut.

When fluid pressure is applied to the passageway 70 for extending the plungers 62–66, fluid pressure is also applied to the opening 229 (opening 220 being in communication with exhaust) thereby to pivot the lever 214 back to the position shown in FIG. 22. This will cause withdrawal of the formation 222 and allow the column of nuts to advance until the foremost nut strikes the formation 230. This formation will enter the passageway 211 prior to complete withdrawal of the formation 222 to insure that a nut does not pass by the formation 230.

It should be apparent that the formation 230 serves to carry the weight of the column of nuts in the flexible conduit 14. Further, this formation provides the necessary clearance between the nut it engages and the adjacent nut so that the nuts in passageway 45 may rotate without resistance as they are engaged by the plungers. This will result in the nuts in the passageway 45 being advanced in a trouble-free manner.

It should be apparent the present invention provides a new and improved apparatus for feeding the nuts substantially simultaneously to a plurality of powered spindles. The conduit 14, as well as the various passageways in the nut driving unit 10, have a width just slightly greater than the distance across are the nuts measured from point to point thereby to minimize the possibility of jamming. In the event of a jam in the nut driving unit 10, access can be readily had to all the passageways therein by swinging open the housing part 20 and 21. However, the possibility of a jam developing in the nut driving unit 10 is rather unlikely. The various passageways 56–60 have widened inlet ends in alignment with the respective plunger 62–66 for receiving alternate nuts from the passageway 45 in a trouble-free manner. The possibility of a serious jam or damage to any of the component parts in the driving unit 10 is eliminated by reason of the operation of the gate 84, the latter controlling the admission of fluid under pressure to the plunger pistons 62–66.

The apparatus of the present invention provides for positive and controlled displacement of the nuts during their entire passage from the vibratory feed mechanism to their threading engagement with the wheel studs. Since the powered spindles may be placed over the threaded studs prior to entry of nuts into the spindles, the possibility of a nut dropping from the nut running apparatus 10 is virtually nil.

Although the embodiment of the invention shown for purposes of illustration has been specially adapted for running nuts on the studs of an automobile wheel, the invention is not to be so limited. It should be apparent the driving unit 10 could be readily altered to provide a different number and arrangement of spindles to accommodate various patterns of studs.

The embodiment of the invention shown for purposes of illustration has been designed to be operated from compressed air. However, the invention is not to be limited to being operated by a pneumatic system as various forms of fluid pressure operated systems could be used.

Although the invention has been shown in but one form, it will be obvious to those skilled in the art it is not to be so limited. On the contrary, the invention is susceptible of various forms and modifications without departing from the spirit and scope of the appended claims.

I claim:

1. In an apparatus of the type having a plurality of power driven spindles for simultaneously driving a plurality of nuts, the improvement comprising, means defining a nut feed passageway extending to each of the spindles, means defining a nut supply passageway communicating with each of said feed passageways, means for advancing a continuous train of nuts in said supply passageway, and feed means including a plurality of feed members associated with respective feed passageways and with said supply passageway for advancing nuts from the latter and into the former.

2. The improvement according to claim 1 wherein said feed passageways have corresponding ends thereof communicating with said supply passageway at a common side thereof, said members consisting of plungers mounted adjacent the side of said supply passageway opposite said common side thereof and in alignment with said corresponding ends, respectively, said plungers being adapted to intersect said train of nuts for substantially simultaneously advancing nuts from the latter to said feed passageways.

3. The improvement according to claim 2 wherein said feed passageway ends and said plungers are arranged for feeding alternate nuts from the train of nuts.

4. The improvement according to claim 2 further defined by, said advancing means serving to advance the nuts in side-by-side relation into said supply passageway, each of said plungers having a width, as measured in a direction parallel with the direction of nut movement in said supply passageway, which is substantial in relation to the width of a nut as measured across the widest portion thereof.

5. The improvement according to claim 1 further defined by, said feed means including a gate and actuating means for moving the latter to and from a blocking position wherein the gate blocks movement of nuts between said supply passageway and all of said feed passageways, and operating means, responsive to movement of said gate, for actuating said members.

6. Apparatus for simultaneously driving a plurality of nuts comprising, a hand manipulatable driving unit including a plurality of powered spindles, a stationary nut advancing unit, a flexible nut conduit connecting said units, advancing means on said advancing unit for supplying nuts in a single continuous train in said conduit, the nuts being in side-by-side relation, and feed means on said driving unit for feeding nuts to said spindles substantially simultaneously from the train of nuts in said conduit.

7. The apparatus according to claim 6 further defined by, said feed means including means defining a first passageway forming an extension of said conduit, and second passageways communicating respective spindles with said first passageway, and plungers for feeding nuts substantially simultaneously from the first passageway and into said second passageways.

8. The apparatus according to claim 7 further defined by, said feed means including a gate and actuating means for moving the latter to and from a blocking position wherein the gate blocks movement of nuts between said first passageway and all of said second passageways, and operating means, responsive to movement of said gate, for operating said plungers.

9. An apparatus for simultaneously driving a plurality of nuts comprising, a housing mounting a plurality of powered spindles in parallel relation with the inner ends thereof being disposed within the housing, said housing including means defining passageways communicating respectively with the inner ends of the spindles, said passageways being arranged to guide nuts to the inner ends of the spindles with the central axes of the nuts in parallel relation with the axes of rotation of the spindles, the nuts traveling in paths contained in a plane perpendicular to such axes, a plurality of reciprocal pushing members mounted on the housing in respective coaxial relation with said spindles at said inner ends thereof for forcing nuts from said inner ends to the outer ends of the spindles and means for feeding nuts along said passageways.

10. The apparatus according to claim 9 further defined by, means for yieldably advancing said pushing members into respective spindles for forcing nuts from said inner ends to said outer ends.

11. The apparatus according to claim 9 further defined by, said housing including first and second sections connected together for movement between opened and closed positions, said first section mounting said spindles and said second section mounting said pushing members, said first and second sections having cooperating guide surfaces defining said passageways thereby to permit access to nuts therein when said sections are moved to the opened position.

12. The apparatus acording to claim 9 further defined by, separate nut orienting means mounted by the housing at the inner end of each of said spindles, each of said orienting means comprising a plurality of yieldably mounted members engageable with the sides of a nut and cooperating with the associated rotating spindle to rotate a nut relative to the spindle for entering the latter in driven relation therewith.

13. The apparatus according to claim 9 further defined by, said housing including a common passageway communicating with each of the first mentioned passageways, which common passageway is configured for receiving a continuous train of nuts in side-to-side relation, and a plurality of plungers on said housing in respective alignment with the first mentioned passageways for substantially simultaneously feeding nuts from said common passageway to the first mentioned passageways.

14. The apparatus according to claim 13 further defined by, a gate mounted by said housing for movement to and from a blocking position, which gate in the blocking position thereof extends into all of the first mentioned passageways for preventing movement of nuts thereinto, actuating means for said gate and operating means for said plungers, which operating means are associated with said actuating means such that the plungers are moved in response to positioning of said gate.

15. An apparatus for simultaneously driving a plurality of nuts comprising, a housing mounting a plurality of powered spindles in parallel relation with inner ends thereof being disposed within the housing, said housing including means defining a first passageway arranged to receive a continuous train of nuts in side-to-side relation, said housing also including means defining a plurality of second passageways opening into the inner ends of respective spindles and opening into said first passageway at a common side thereof, said passageways being arranged to guide nuts to the inner ends of the spindles with the central axes of the nuts in parallel relation with the axes of rotation of the spindles, the nuts traveling in paths contained in a plane perpendicular to such axes, a plurality of reciprocal pushing members mounted on the housing in respective coaxial relation with said spindles at said inner ends thereof for forcing nuts from said inner ends to the outer ends of the spindles, a plurality of plungers mounted adjacent the side of said first passageway opposite said common side thereof and in alignment with the adjacent ends of said second passageways, respectively, said plungers being mounted for movement across said first pasageway for feeding nuts from the latter and into the second passageways.

16. The apparatus according to claim 15 further defined by, a gate mounted by said housing for movement to and from a blocking position, which gate in the blocking thereof extends into all of the second passageways for preventing movement of nuts thereinto, actuating means for said gate and operating means for said plungers, which operating means are associated with said actuating means such that the plungers are moved in response to positioning of said gate.

17. The apparatus according to claim 15 further defined by, separate nut orienting means mounted by the housing at the inner end of each of said spindles, each of said orienting means comprising a plurality of yieldably mounted members engageable with the sides of a nut and cooperating with the associated rotating spindle to rotate the nut relative thereto for entering the spindle in driven relation therewith.

18. In a nut driving apparatus having at least one powered spindle, the improvement comprising, housing means mounting said spindle at one end thereof and including means defining a passageway communicating with said one end of the spindle, means for rotating the spindle, said passageway being arranged to advance nuts one at a time to the inner end of the spindle, the nuts traveling in a continuous train with the central axes thereof being parallel with the axis of rotation of the spindle, the path of movement of the nuts along said passageway being in a plane perpendicular to such axes, a reciprocating pushing member on said housing in coaxial relation with said spindle for pushing the leading nut in the train of nuts into said spindle, and nut orienting means mounted by the housing adjacent the inner end of the spindle, which orienting means includes yieldable members engageable with the nut for restraining its rotation thereby to align the nut for axial movement into the rotating spindle under the influence of said pushing member.

19. The improvement according to claim 18 wherein said yieldable members comprise a plurality of balls equal in number to the number of sides on the nut, the balls being mounted in equally spaced, radially disposed bores the axes of which are contained in a plane perpendicular to the axis of rotation of the spindle, the bores permitting movement of portions of the balls into the spindle for engagement with a nut therein.

20. The improvement according to claim 19 wherein an O-ring engages the balls for yieldably urging the same toward the rotational axis of the spindle.

21. The improvement according to claim 19 further defined by, slide retaining means mounted adjacent said orienting means for receiving a nut in said passageway prior to its engagement with the orienting means, said retaining means having yieldably mounted elements engageable with sides of the nut to shift the latter about its central axis for alignment of the flat sides of the nut with said balls, respectively.

22. In a nut running apparatus of the type having a plurality of powered spindles, the improvement comprising, a housing including means defining a first passageway configured to receive a continuous train of nuts in side-by-side relation, said housing also including means defining a plurality of second nut receiving passageways with corresponding ends thereof communicating with respective spindles, the other ends of said second passageways communicating with said first passageway at a common side thereof, a gate mounted in the housing for movement to and from a blocking position, which gate in the blocking position thereof extends at least partially into each of said second passageways for preventing movement of nuts thereinto, fluid pressure actuating means for moving said gate, which actuating means include a stem connected to the gate and having a first piston connected thereto by yieldable means whereby the first piston and stem move in unison in either direction for a predetermined stroke and thereafter the piston moves relative to the stem in either direction, movement of the piston through said predetermined stroke serving to move the gate to and from its blocking position, said housing mounting a plurality of plungers adjacent the side of said first passageway opposite said common side thereof, said plungers being in respective alignment with said second passageways and movable across said first passageway for feeding nuts into the former, said plungers being arranged to pass across the gate in either position thereof, other fluid pressure means for said plungers including a second piston connected to each plunger for reciprocating the latter, valve means for alternately admitting fluid under pressure to opposite sides of said second pistons, operating means for said valve means including means mechanically engaged with said first piston such that the latter operates the valve means during its movement relative to said stem.

23. In a nut running apparatus of the type having a plurality of powered spindles, the improvement comprising, a housing including means defining a first passageway configured to receive a continuous train of nuts in side-by-side relation, said housing also including means defining a plurality of second nut receiving passageways with corresponding ends thereof communicating with respective spindles, the other ends of the second passageways communicating with said first passageway at a common side thereof, a gate mounted in the housing for movement to and from a blocking position, which gate in the blocking position thereof extends at least partially into each of said second passageways for preventing movement of nuts thereinto, fluid pressure actuating means for said gate, which actuating means include a stem connected to said gate for moving the latter, a first piston mounted on said stem for axial movement relative thereto, yieldable means interposed between said first piston and said stem for imparting movement to the latter in either direction in response to corresponding movement of the former and for allowing limited movement of the first piston relative to the stem after a predetermined extent of movement of the first piston with the stem, movement of the first piston in unison with the stem in one direction and in an opposite direction serving to move the gate to and from its blocking position, respectively, said housing mounting a plurality of plungers adjacent the side of said first passageway opposite said common side thereof, said plungers being in respective alignment with said second passageways and movable across said first passageway for feeding nuts into the former, said plungers being arranged to pass across the gate in either position thereof, other fluid pressure actuating means for said plungers including a second piston connected to each plunger for reciprocating the latter, first and second valve means associated with said other fluid pressure means and actuatable for retracting and extending said plungers, respectively, actuating means for said valve means including means mechanically engaged with said first piston such that movement of the latter in said one direction relative to the said stem actuates the first valve means for retracting said plungers and movement of said first piston in said other direction relative to said stem actuates the second valve means for extending said plungers.

24. An apparatus for advancing nuts in a continuous train comprising, means defining a guideway arranged to receive and guide nuts in a continuous train in side-by-side relation, which guideway has an inlet and an outlet, a vibratory feed mechanism for supplying nuts to said inlet, a member mounted adjacent said guideway for reciprocal movement through a predetermined stroke and along a path parallel with said guideway, an element pivotally mounted on said member and engageable with a trailing side of a nut during movement of said member toward said outlet for positively advancing a preselected number of nuts along said guideway from said inlet to said outlet.

25. Apparatus for simultaneously driving a plurality of nuts comprising, a driving unit including a plurality of powered spindles, a nut advancing unit remote from said driving unit, a nut conduit connecting said units, means for supplying nuts in a single continuous train in said conduit, and feed mechanism on said driving unit for feeding nuts to said spindles substantially simultaneously from the train of nuts.

26. The apparatus according to claim 25 wherein said means include positive displacement means for advancing the nuts in said conduit, and control means interposed between said driving unit and the adjacent end of said conduit for counteracting the force developed by said displacement means and thereby to prevent transmission of such force to the nuts in the driving unit.

27. The apparatus according to claim 26 wherein said control means includes movable members for allowing passage of nuts into said driving unit in separate groups, the number of nuts in each group corresponding to the number of said spindles.

28. The apparatus according to claim 26 wherein said control means include members alternately engageable with first and second nuts spaced apart in the train of nuts by a plurality of other nuts corresponding in number to one less than the number of such spindles.

References Cited
UNITED STATES PATENTS

| | | | |
|---|---|---|---|
| 2,953,049 | 9/1960 | Vilmerding | 81—57.37 |
| 2,978,936 | 4/1961 | Orner | 81—57.14 |
| 2,878,700 | 3/1959 | Reynolds | 81—57.37 |
| 2,763,173 | 9/1956 | Bailey et al. | 81—57.37 |

JAMES L. JONES, Jr., Primary Examiner

U.S. Cl. X.R.

81—57.36, 57.37; 221—93